July 11, 1939. A. E. SCHUBERT 2,165,418
REVERSING ARRANGEMENT FOR DOCUMENT REPRODUCING MACHINES
Filed Aug. 4, 1937 2 Sheets-Sheet 2

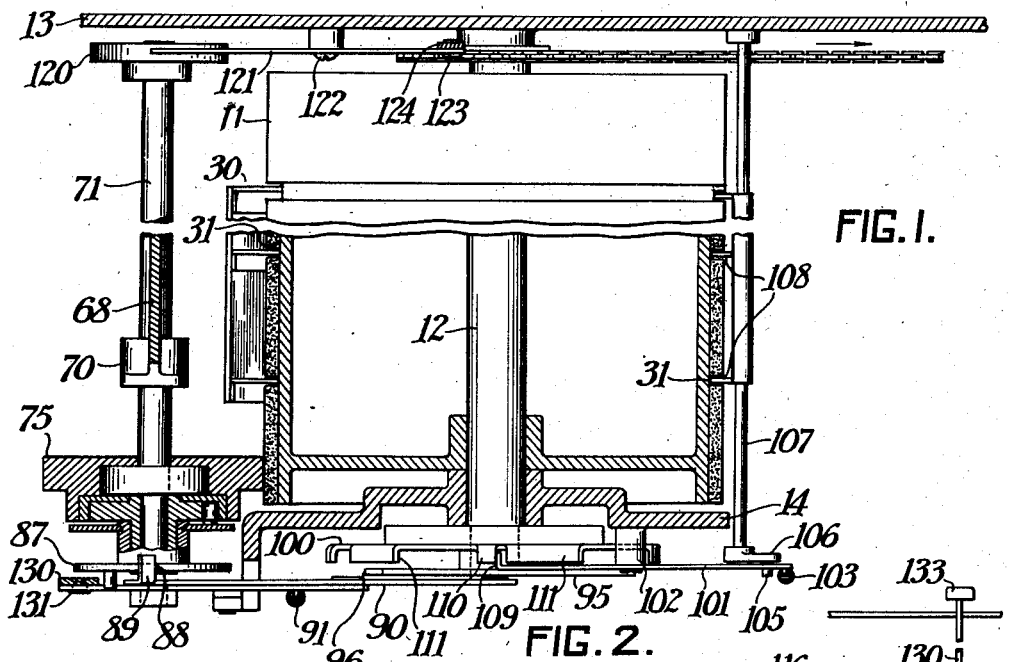
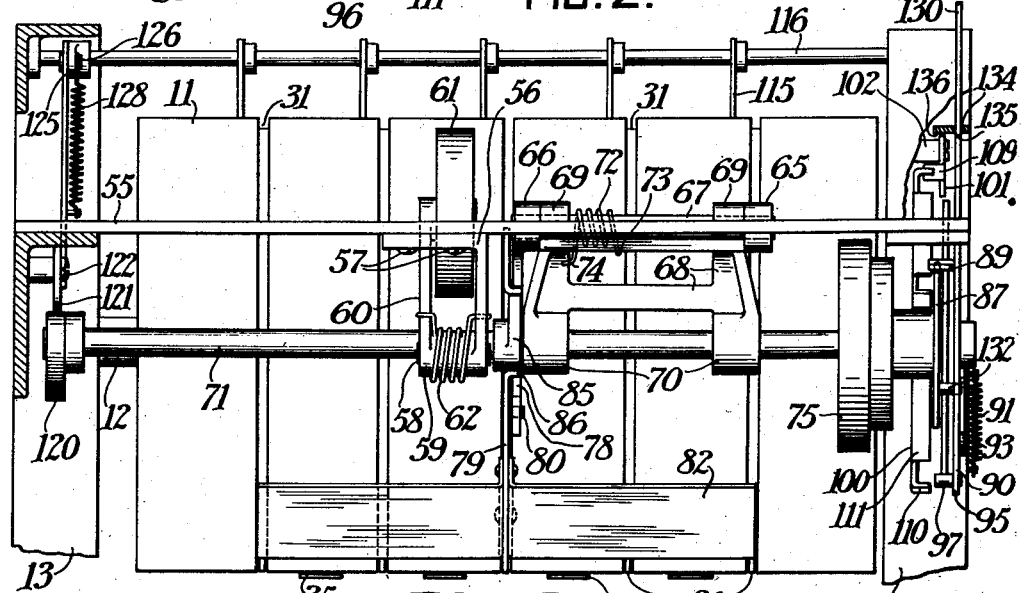
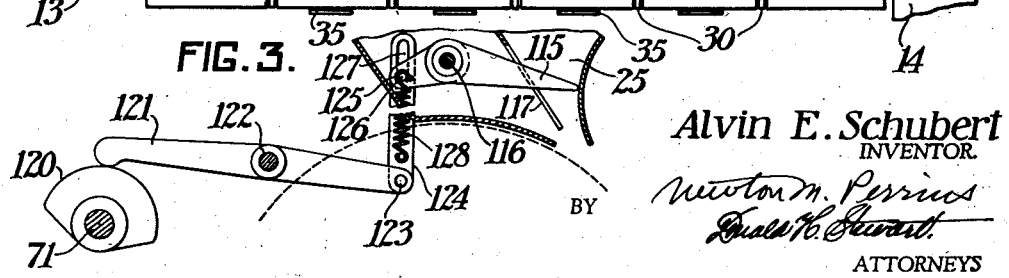

Alvin E. Schubert
INVENTOR
BY
ATTORNEYS

Patented July 11, 1939

2,165,418

UNITED STATES PATENT OFFICE 2,165,418

REVERSING ARRANGEMENT FOR DOCUMENT REPRODUCING MACHINES

Alvin E. Schubert, Rochester, N. Y., assignor to Eastman Kodak Company, Rochester, N. Y., a corporation of New Jersey Application August 4, 1937, Serial No. 157,361

20 Claims. (Cl. 271—3)

The present invention relates to a machine for photographically recording checks or other documents, and more particularly to an arrangement whereby one or more of the checks or documents may be reversed so that both sides thereof may be recorded. The reversing mechanism of the present invention is particularly designed for use in a recording apparatus such as shown and described in the patent to C. J. Hughey, Number 1,976,346, dated October 9, 1934.

An object of this invention is the provision in a machine of this class of a mechanism for feeding the document through the machine so as to photograph one side thereof, then automatically reversing the document and again feeding it through the machine so that the other side may also be photographed.

Another object of the invention is the provision of a document reversing mechanism which operates in proper timed relation to feeding and photographing mechanisms.

Still another object of the invention is the provision of a control for the reversing mechanism which is actuated by the movement of the document through the machine.

A further object of the invention is the provision of a reversing mechanism which may be selectively moved to an operative position to photographically record both sides of one or more of the documents, or may be moved to an inoperative position in which only one side of the documents will be recorded.

A still further object of the invention is the provision of an arrangement, operated in timed relation to and controlled by the reversing mechanism, for preventing the feeding of a check or other small document until the preceding check has been photographed on both sides.

Yet another object is the provision of a document reversing mechanism which is automatic, positive in its action, and operated in proper timed sequence to the advancing and photographing of the document.

To these and other ends, the invention resides in certain improvements and combinations of parts all as will be hereinafter more fully described, the novel features being pointed out in the claims at the end of the specification.

In the drawings:

Fig. 1 is a plan view of a portion of the mechanism illustrated in Fig. 4, with the feeding hoppers removed and the drum partly in section showing the arrangement of the parts for controlling and operating the reversing mechanism;

Fig. 2 is an end elevation view of the mechanism illustrated in Fig. 4 as viewed from the left, but with the feeding hoppers removed and parts shown in section.

Fig. 3 is a fragmentary view of parts of the mechanism illustrated in Figs. 4 and 5, showing partly in side elevation and partly in section the arrangement for obstructing one of the feeding hoppers to prevent the feeding of a document until the preceding document has been photographed on both sides;

Figures 4, 5:
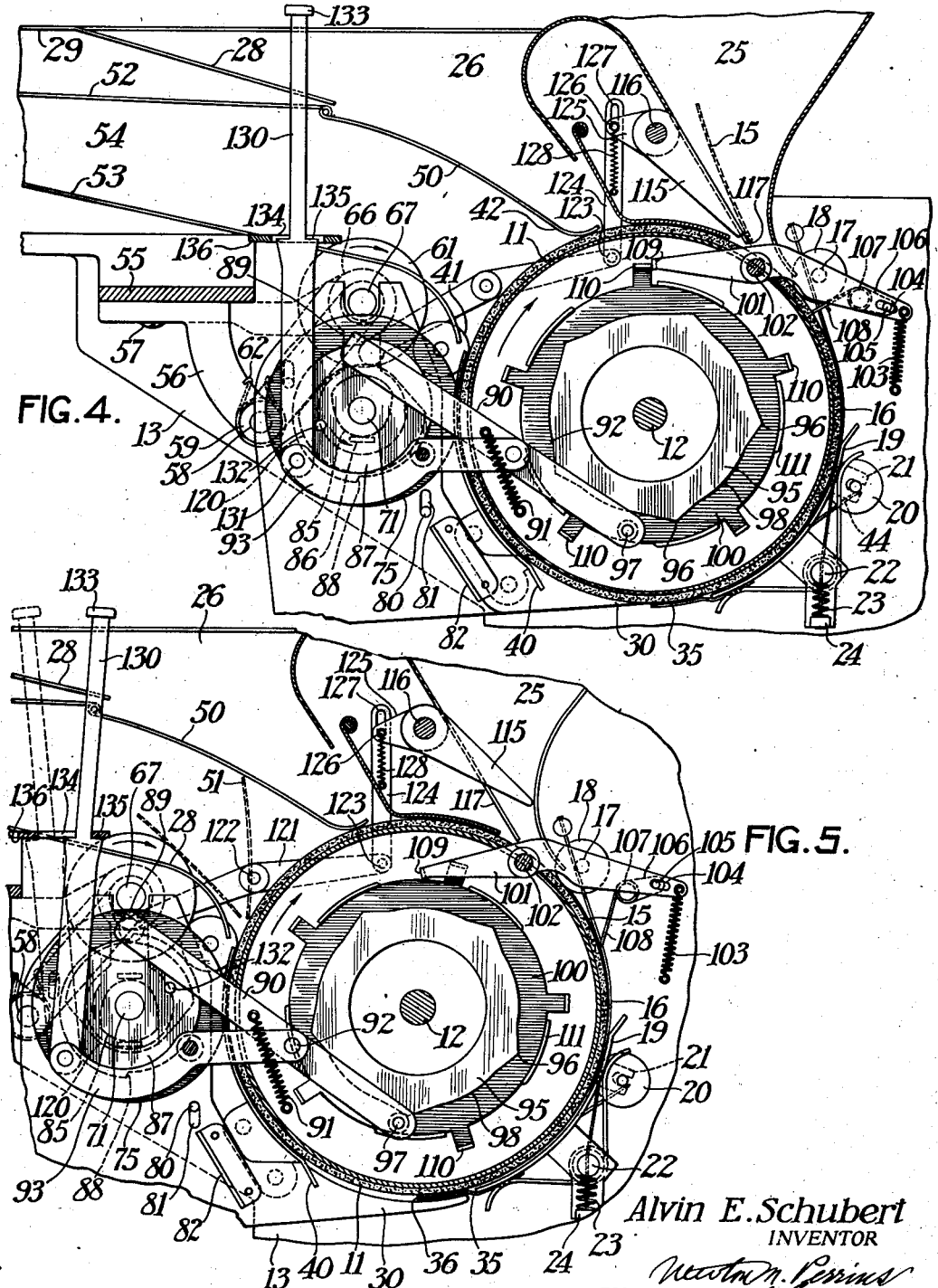

Fig. 4 is a side elevation partially in section of a document recording machine, with the side plates removed, showing the arrangement of the operating and control mechanisms for reversing the document; and Fig. 5 is a view similar to Fig. 4, but with the parts in a slightly different position so as to direct the document around the rear of the drum so that the document may be reversed and again fed through the machine so that the other side of the document may be photographed.

Similar reference numerals throughout the several views indicate the same parts.

The invention comprises, in its broadest aspect, a rotating drum for advancing documents through the photographic field of a camera so that the latter may photographically record one side of the document. Two suitable feeding stations or hoppers are provided, one for small documents such as checks, the other for larger documents such as letters, ledger sheets, etc. The present invention provides suitable mechanism which is actuated by the advancing of the document by the drum for reversing the document, and again feeding it through the photographic field of the camera so that the other side of the document may also be photographically recorded. This mechanism is so arranged that it may be selectively positioned so as to record both sides of a single document or a series of documents. When, however, only one side of a document is to be recorded, the reversing mechanism may be moved to an inoperative position so that when the one side has been photographed the document is automatically discharged from the machine.

Referring now to the drawings, there is shown a rotating feeding or advancing drum 11 which is mounted for rotation on the shaft 12 journaled in opposite walls 13 and 14 of the machine housing, the front of the machine being at the left as viewed in Figs. 4 and 5. The drum is adapted to advance documents, generally indicated as 15 Figs. 4 and 5 through the photographic field of a camera, not shown, so that the document may be photographically recorded.

The document 15 is held in engagement with the drum during the passing through the photographic field of the camera by means of a plurality of tightly strung guide wires 16 which extend part way around the periphery of the drum, in a manner clearly illustrated in Figs. 4 and 5. A shaft 17 is mounted in the side walls 13 and 14 of the machine housing, and carries one or more idler rolls 18 which direct the document, in a manner hereinafter described, between the guide wires 16 and the drum 11. An arcuate shaped bracket 19, secured to the machine housing in any suitable manner, extends across the lower front portion of the drum 11, and carries a series of idler rollers 20, which are adapted to hold the document in engagement with the drum 11 after the passing of the document through the field of the camera. These rollers are supported in bearings 21, and are resilient pressed toward the drum 11 by leaf springs 44, the bearings and springs being formed from the material of the bracket 19, all of which is clearly illustrated in Figs. 4 and 5.

The guide wires 16 extend downwardly and through a small shaft or rod 22 carried by the bracket 19, as shown in Figs. 4 and 5. These wires are maintained in proper tension by means of coil springs 23 interposed between the shaft 22 and the lugs 24 suitably secured to the lower ends of the wires 16, see Figs. 4 and 5. The drum 11 may be connected to and operated in timed relation with a photographic camera in a manner clearly shown and described in the above-mentioned patent to Hughey.

The machine is provided with a pair of document feeding stations or hoppers, clearly indicated by the numerals 25 and 26, positioned adjacent the top the drum 11 and adapted to receive documents to be fed onto the drum. The rear hopper 25 is adapted to receive small documents, such as checks, which are dropped edgewise, as shown in Fig. 4, into the hopper 25 and are then carried or advanced by the drum 11 through the field of the camera to be photographed thereby. The front hopper 26 is primarily intended for larger documents such as letters, ledge sheets, and the like. This front hopper is provided with a rearwardly and upwardly sloping bottom 28 which terminates in a feeding board or support 29 on which the larger decuments are positioned prior to the feeding thereof into the hopper 26. It is thus apparent from inpection of Figs. 4 and 5 that when the documents are fed into either the hopper 25 or 26, the rotating drum 11 will pick up and carry the documents, in a clockwise direction, through the photographic field of the camera so as to photograph one side of the document. The document, during its travel, is held in engagement with the drum 11 by reason of the guide wires 16 and the rollers 18 and 20. When the document reaches the bottom of the drum it is stripped therefrom by means of a plurality of fingers 30 which are recessed in circumferential grooves 31 formed in the drum 11, as clearly shown in Figs. 4 and 5.

It is often desirable, particularly in the case of large checks, to not only photograph the front of the check, as above described, but to also photograph the back of the check so that a photographic record of the various endorsements may also be secured. Even with large documents, it is often desirable, and in some cases essential, to photograph both sides thereof. This photographing of the opposite side of the document may obviously be accomplished by feeding the document through the machine, then manually reversing or flipping the document over, and then again manually feeding it through the machine. The present invention, however, provides an arrangement whereby this reversing and refeeding of the document is accomplished automatically so that all the operator has to do is to initially feed the documents through one of the hoppers 25 or 26.

To secure this result, the fingers 30 are movable downwardly, by means hereinafter described, from the position shown in Fig. 4 to the position shown in Fig. 5. In the latter position, the fingers 30 have been moved out of the recesses 31 and extend slightly below the surface of the drum 11. It is now apparent that instead of stripping the document from the drum, the fingers 30 will now guide or direct the document to the rear side of the drum. This movement of the fingers or guides 30 is in proper timed relation to the movement of the document 15 by the drum so that the fingers will be moved out of the recesses 31 just prior to the time the document approaches the bottom of the drum. To facilitate the ready passage of the document 15 between the fingers 30 and the drum 11, a set of resilient members 35 are provided. Each of these resilient members has one end thereof secured to the bracket 19 while the free end extends over the lower face of the drum 11; and, when the fingers 30 are in the lowered position, termination between the fingers and the drum, as shown at 36, Fig. 5, to direct the document therebetween. The guides or fingers 30 thus perform two separate and distinct functions. When in the position shown in Fig. 4, they act to strip the document 15 from the rotating drum 11. When however, they are moved to the position shown in Fig. 5, they act to guide or direct the document to the rear face of the drum 11 and to a reversing mechanism, hereinafter described.

From the fingers 30, the document 15 is guided between a plate 40 and the drum 11. The plate 40 preferably extends the full width of the drum, and is secured in any suitable manner to the opposite side walls 13 and 14. For the purposes of clarity, this plate has been omitted in Fig. 2. The plate 40 preferably does not engage the drum 11, but is spaced slightly therefrom, as clearly shown in Figs. 4 and 5. As the document advances under the plate 40, it may behld against the drum 11 by means of one or more series of rollers 41, which are supported in bearings struck up from the material of the plate 40, and are resiliently pressed toward the drum 11 in the same manner as the rollers 20, above described. The plate 40, with its rollers, thus cooperates with the guide fingers 30 to guide or direct the document to the reversing plate to be presently described.

The document 15 is carried around by the drum 11 until it strikes a deflector or reversing plate 50. This plate preferably forms a continuation of the bottom 28 of the hopper 26, and is hinged to a plate 52 which cooperates with a spaced plate member 53 to form a document reversing chamber 54. This chamber is of such a length as to accommodate the longest document which can be fed through the machine. As the document 15 strikes the plate 50, it is stripped from the drum 11, and reversed or flipped over in the chamber 54, as shown at 51 Fig. 5, so that the opposite side will be turned uppermost. It is now apparent that if the document is refed through the machine, the opposite side thereof will pass through the photographic field of the camera and will thus be recorded. In this refeeding operation, the forward edge of the document will engage the lower curved portion 42 of the plate 50 to lift the latter slightly about its hinge, the portion 42 then resting on the document to press the later against the drum 11.

A plate or support 55 extends across the front of the machine and is secured to the opposite walls 13 and 14, as shown in Fig. 2. An L-shaped bracket 56 is secured by screws 57 to the under side of the plate 55, adjacent the center thereof, and carries a stub shaft 58. A bearing 59 is loosely mounted on the shaft 58 and has integrally formed therewith a forwardly extending arm 60, the free end of which carries a rubber coated roller 61. A coil spring 62 is wrapped around the bearings 59 and has one end thereof engaging the bracket 56 while the other end is hooked over the arm 60. The spring 62 thus yieldably holds the roller 61 in engagement with the roller 41 so that the roller 61 will be driven from the drum 11, in the direction indicated by the arrow.

As the document is flipped over or reversed, as above described, the rotating roller 61 picks up the document and directs it onto the rotating drum 11, to be advanced thereby so that the opposite side of the document may be photographed. While the reversing plate 50 actually flips the document over, the fingers 30 and the plate 40 cooperate to feed or direct the document to the reversing plate, and the roller 61 then directs the reversed document onto the rotating drum, so that these members all cooperate to perform the reserving operation, and may, therefore, be broadly considered as document reversing means. Furthermore, the plate 40 and the fingers 30 cooperate to guide the document around the rear face of the drum, so that the plate 40 and the fingers 30 may be broadly classed as means for guiding document to the reversing plate 50.

The right end of the support 55, as viewed in Fig. 2, carries a pair of spaced rearwardly extending arms 65 and 66 preferably formed integral with the support 55. These arms provide bearings for a shaft 67 from which is hung a suspended yoke, broadly designated by the numeral 68. This yoke is formed with a pair of spaced upper bearings 69 through which the shaft 67 extends, and a pair of spaced lower bearings 70 which support a lower shaft 71, the purpose of which will be hereafter more fully described. By means of this arrangement the shaft 71 is hung or suspended between the arms 65 and 66. A coil spring 72 is wrapped around the shaft 67 and has one end 73 thereof hooked under the support 55 and the other end 74 engaging the yoke 68 so as to yieldably force the shaft 71 rearwardly or toward the drum 11, to bring a clutch housing 75, loosely mounted on the shaft 71, into engagement with the drum 11. For the purpose of clarity, the spring 72 is not shown in Figs. 4 and 5.

The arm 66 is formed with a depending portion 78 on which is mounted a flat member 79, of sheet metal, secured to the portion 78 by screws 80 extending through slots 81 in the member 79, whereby the latter may slide relative to the portion 78 for a purpose to be later described. The lower portion of the member 79 is extended forwardly to form one of the fingers 30, as will be apparent from the inspection of Fig. 2. The other fingers 30 are formed integral with or secured to plates 82 which are fastened to opposite sides of the member 79, and are movable as a unit therewith so that all the fingers 30 may move in unison.

The shaft 71 extends through the member 79, and has mounted thereon a cam 85 which engages a pair of upstruck lugs 86 formed from the member 79. The cam 85 is of such shape that a half revolution of the shaft 71 will move the member 79 and, hence, the fingers 30 from the position shown in Fig. 4 to the position shown in Fig. 5 to direct the document to the reversing plate 50. However, the next half revolution of the shaft 71 will return the fingers to the position shown in Fig. 4 in which the fingers are recessed in the grooves 31 so as to strip the document 15 from the drum 11. The shaft 71 is driven by a suitable clutch, not shown, mounted in the clutch housing 75. When the clutch is engaged, the shaft 71 is driven by reason of the engagement of the clutch housing 75 with the drum 11. This clutch arrangement is preferably of the same construction as that shown and illustrated in the above-mentioned patent to Hughey, and need not be further described.

The clutch also comprises a complementary member in the form of a disk 87 which is secured to and rotatable as a unit with the shaft 71. When this disk is held stationary, the clutch is disengaged and the shaft 71 will not be rotated. When, however, the disk is released, it is clutched to the clutch housing 75 and the shaft 71 is thus driven. As the clutch housing engages and is driven by the drum 11, it is evident that the shaft 71 will be rotated in timed relation to the rotating of the drum 11.

The disk 87 is formed with a pair of diametrically arranged abutments or shoulders 88 with which a lug 89 of a lever or blocking member 90 is adapted to engage. When the lug 89 is in engagement with one of the abutments 88, as shown in Fig. 4, the disk 87 and the shaft 71 are held against rotation. However, when the lug 89 is moved out of obstructing position, as shown in Fig. 5 and to be later described, the disk 87 is clutched to the clutch housing 75 and the shaft 71 is rotated, as is apparent.

After the lug 89 is moved out of engagement with the abutment 88, it rides along the surface of the disk 87 until the next abutment 88 is brought into registry with the lug 89, at which time the lug drops, under the action of a coil spring 91, against the next abutment 88 to prevent further rotation of the disk 87 and the shaft 71. Thus each time the lever 90 is moved out of obstructing position, the shaft 71 makes a half revolution so as to change the position of the fingers 30, as above described. The lever 90 is held in engagement with the disk 87 by reason of the spring 91, one end of which is secured to the side wall 14 while the other end is fastened to the lever 90 which in turn is pivoted at 92 to the bellcrank 93.

It is imperative that the rotation of the shaft 71 and the movement of the fingers 30 be in proper timed relation to the rotation of the drum 11. To this end, the drum shaft 12 has loosely mounted thereon a five-pointed cam 95, the points 96 of which are arranged to periodically engage a laterally projecting pin 97 on the right end of the lever 90, as viewed in Figs. 4 and 5, to periodically move the lug 89 out of engagement with the shoulders 88, as shown in Fig. 5, so that the shaft 71 may make a half revolution. As the cam 95 rotates, the pin 97 moves off the point 96 and onto a dwell portion 98 of the cam 95 so that the lug 89 may be moved downwardly, under the action of the spring 91, to ride on the surface of the disk 87 whereupon the lug engages the next abutment 88 to arrest the rotation of the shaft 71. It is clear from the above description that the rotation of the shaft 71 and the movement of the fingers 30 are in timed relation to the rotation of the drum 11, and that the cam 96 controls the operation of the shaft and fingers.

A trip plate 100 is also loosely mounted on the shaft 12. This plate and the cam 95 are arranged to be periodically clutched to and driven as a unit with the drum 11, in a manner clearly set forth in the above referred to patent to Hughey. The clutching arrangement is such that when the trip plate 100 is held stationary, both the plate and the cam 95 are unclutched from the drum and do not revolve. When, on the other hand, the trip plate 100 is released, both the plate and the cam, are clutched to the drum and rotate as a unit therewith, whereby the shaft 71 will be rotated, in the manner above described.

In order to insure the proper functioning of the machine, it is essential that the reversing mechanism, above described, be also operated in proper timed relation to the advancing of the document 15 by the drum 11. To this end, the advancement of the document is utilized to initiate a sequence of operations all of which are in proper timed relation with the movement of the document by the drum.

To secure this result, a control arm 101 is pivoted intermediate its ends to a post 102 which extends outwardly from the side wall 14. The arm tends to rotate in a clockwise direction under the action of the spring 103. The right end of the arm is slotted, as shown at 104, to receive a laterally extending pin 105 secured to a member 106 mounted on the shaft 107 which also carries fingers 108, all of which is clearly shown in Figs. 4 and 5. The left end of the arm 101, as viewed in Figs. 4 and 5, is formed with a lip or offset 109 which is arranged to abut lugs 110 and 111 bent out from the material forming the trip plate 100. The lugs 111 are nearer the center of the plate 100 than the lugs 110, and are displaced angularly therefrom, as shown in the drawings. This arrangement is quite similar to that shown in Fig. 3 of the above-mentioned patent to Hughey.

Upon the entry of the document between the drum 11 and the roller 18, the fingers 108 are tripped, and the member 106 is rotated in a counter-clockwise direction thus also similarly rotating the control arm 101 so that the lip 109 no longer engages the lug 110. As the trip plate 100 is now free, the plate and the cam 95 are clutched to the drum 11 and rotated as a unit therewith. This rotation of the cam 95 brings one of the points 96 thereof into engagement with the pin 97 on the lever 90 to move the lug 89 out of engagement with the shoulder 88 of the disk 87 so as to permit a half revolution of the shaft 71, as above described. This half revolution, moves the fingers 30 to the position shown in Fig. 5. The trip plate 100 and the cam 95 continue to rotate until the lip 109 engages one of the lugs 111 whereupon the trip plate is again held so as to unclutch the plate 100 and cam 95 from the drum 11. The lip 109 remains in engagement with the lug 111 during the passage of the document 15 under the fingers 108. When, however, the document has cleared the fingers 108, the latter rotate in a clockwise direction to the position shown in Fig. 4 in which the fingers 108 extend into the grooves 31 of the drum. This movement of the fingers 108 will also rotate the arm 101 in a clockwise direction to lift the lip 109 out of engagement with the lug 111. The trip plate is again free, and will rotate, with the cam 95, until the next lug 110 strikes the lip 109 whereupon the plate 100 is again stopped. During this time, the pin 97 of the lever 90 rides on the dwell portion 98 of the cam 95 so that the lug 89 may engage the next shoulder 88. In this manner, the movement of the document through the machine initiates an operating cycle by which the reversing mechanism is controlled and operated in timed relation to the rotation of the feeding drum and the movement of the document thereon.

Small documents such as checks may be fed quite rapidly through the rear feed hopper 25. If both sides of a check are to be photographed, it is desirable to have the image of each side arranged on adjacent image areas of the film strip. For this reason, it is advisable to delay the feeding of the next check until the preceding check has been photographed on both sides. This delayed feeding may be done manually, but it is preferred to accomplish it automatically so that all the operator has to do is to feed the check into the hopper.

This delayed feeding is accomplished, in the present embodiment, by means of a series of obstructing fingers 115, of the shape best shown in Fig. 3. These fingers are mounted on and rotatable with a shaft 116, and are adapted to project through slots 117 in the rear wall of the hopper 25 and to extend thereacross, as shown in Fig. 3, to prevent further feeding of checks to the drum 11. The movement of these fingers is controlled by a cam 120 mounted on shaft 71. This cam engages one end of a lever 121 pivoted at 122 to the machine frame. The other end of the lever 121 is pivotally connected at 123 to a vertical member or link 124 which is in turn connected to an arm 125 secured to and rotatable with the shaft 116. It is apparent from an inspection of Fig. 3, that when the left end of the lever 121 is raised upwardly by the cam 120, the fingers 115 will be thrown upwardly across the throat of the hopper 25 to prevent further feeding of checks to the drum 11. The cam 120 is so designed that the fingers 115 will be quickly thrown into obstructing position when the guide fingers 30 are moved downwardly to direct the document to the rear face of the drum. Such an arrangement thus prevents the feeding of a succeeding check until the preceding check has been photographed on both sides.

A resilient connection is preferably provided between the link 124 and the arm 125. To secure this result the free end of the arm 125 has scured thereto a laterally projecting pin 126 which projects into a slot 127 formed in the upper end of the link 124. A spring 128 has one end thereof anchored to the link 124, and the other end secured to the pin 126 so as to provide a yieldable connection between the link 124 and the arm 125. Referring now to Fig. 3, it is seen that when the fingers 115 are across the hopper 25, the pin 126 engages the bottom of the slot 127. Any pressure which is now applied to the fingers 115 will move the pin 126 upwardly in the slot 127 against the action of the spring 128. This yieldable arrangement enables the trailing portion of a long document to freely slide between the hopper wall and the ends of the fingers 115, yet prevents the feeding of a second document or check to the drum 11 until the preceding document has been photographed on both sides.

The above described reversing mechanism may be manually moved to an operative position in which a number of consecutive documents may be photographed on both sides, or movable to an inoperative position in which subsequent documents are photographed only on one side. This manual moving means is in the form of a handle 130 the lower end of which is connected at 131 to the left end of the bellcrank 93, as viewed in Figs. 4 and 5. When this handle 130 is moved to the front position, shown in dotted line Fig. 5, the bellcrank 93 is rotated slightly in the counterclockwise direction to bring the pin 97 of the lever 90 into engagement with the cam 95. With the handle in this position, the checks or documents will be photographed on both sides. When, however, the handle is shifted to the neutral position, shown in Fig. 4, the left end of the bellcrank 93 is lifted slightly upwardly thus depressing the right end thereof whereby the pin 97 is moved out of engagement with the cam 95. The reversing mechanism is now disconnected from the drum 11 so that the documents which are now fed through the machine will photograph only on one side.

Occasionally it is necessary to photograph both sides of only one document out of a group, the remaining documents being photographed only on one side. To accomplish this, the handle 130 is moved to a rear position, shown in full lines in Fig. 5, thus rotating the bellcrank 93 to bring the pin 97 into engagement with the cam 95, in the same manner as when the handle 130 is moved to the front position as described in the preceding paragraph. The document to be photographed on both sides is now fed in the machine, the guide fingers 30 operating to guide the document to the reversing plate 50 and the roll 61 serving to re-feed the document to the drum 11. When, however, the shaft 71 rotates to move the fingers 30 to the position shown in Fig. 4, a pin 132 projecting outwardly from the disk 87 strikes the handle 130 and moves the latter to the left or to the neutral position shown in Fig. 4. When the handle is thus moved to the neutral position, the pin 97 is automatically moved out of engagement with the cam 95 and the reversing mechanism becomes inoperative. In this manner, occasional checks may have both sides thereof photographed, while subsequent checks have only one side thereof photographed, the change-over being automatic. The handle 130 is provided with a gripping portion 133 which projects upwardly through an opening 134 in the machine frame. When the handle is moved in either the front or rear position, it is also moved downwardly so as to bring one of the shoulders 135 into engagement with the under surface 136 of a member of the machine frame as shown in Fig. 5, to lock the handle 130 in adjusting position.

The machine operates as follows: The handle 130 may be selectively moved to a neutral position, shown in Fig. 4, so as to move the pin 97 out of engagement with the cam 95. Now when checks or documents are fed through the hoppers 25 and/or 26, the documents are advanced by the drum 11 through the photographic field of the camera so as to photograph one side of the document. The singly recorded document is then stripped off the drum by the fingers 130 and discharged to a suitable receptacle or hopper not shown. When, however, the handle 130 is moved to the front position, shown dotted in Fig. 5, the pin 97 is moved into engagement with the cam 95 thus operatively connecting the reversing mechanism to the drum 11. The advancing of the document by the drum 11 operates the arm 101 to move the lip 109 thereof out of engagement with the lug 110, the trip plate 100 is now free and thus automatically clutches the plate and the cam 95 to the drum 11. Upon rotation of the cam 95, a point 96 thereof engaging the pin 97 to rotate the lever 90 about its pivot to lift the lug 89 out of engagement with one of the shoulders 88 of the disk 87. As the disk 87 is now free, it is clutched to the constantly driven clutch housing 75 to rotate the shaft 71, so as to move the fingers 30 downwardly into position to direct the document 15 to the reversing plate 50.

When, however, the shaft 71 has made a half revolution, the lug 89 engages the opposite shoulder 88 to arrest the rotation of the shaft 71. The reversed check is now refed by the roller 61 to the drum 11. The second passage of the document through the machine repeats the above cycle, the fingers 31, however, are now moved upwardly into the recesses 31, and act to strip the document from the drum. The movement of the handle 130 to the rear position, shown in full line in Fig. 5, also moves the reversing mechanism into position to reverse the document so that both sides thereof may be photographed. When, however, the first document is reversed, the pin 132 on the disk 87 engages the handle 130 to automatically move the latter forwardly or to the neutral position so that subsequent checks will be photographed only on one side. Thus by means of this arrangement a series of checks may be photographed on either one or both sides, or a selected check or document may be photographed on both sides while the remaining checks or documents are photographed only on one side.

It is thus apparent from the above description that the present invention provides an arrangement whereby checks or other documents may have one or both sides thereof photographically recorded. It is also apparent that the reversing mechanism may be selectively positioned so that designated documents may be photographed on both sides while the remaining documents are photographed only on one side. The reversing mechanism is entirely automatic so that once positioned, the operator need only feed the documents to one of the feeding hoppers. Furthermore, the reversing mechanism is arranged to operate in proper timed relation to the feeding drum and to the movement of the document thereon, the advantages of which are obvious.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention and the scope of the appended claims.

I claim:

1. In a document handling device, the combination with a rotating drum for advancing a document through the photographic field of a camera so as to photograph one side of said document, of means for reversing said document so that the other side thereof may be advanced by said drum through said field and photographed by said camera, means movable radially of said drum for guiding said document to said reversing means, and means for controlling said movable means from said drum and in timed relation to the rotation thereof.

2. In a document handling device, the combination with a rotating drum for advancing a document through the photographic field of a camera so as to photograph one side of said document, of guide means controlled by the rotation of said drum and movable radially therefrom in timed relation to said rotation, means cooperating with said guide means for reversing said document so that the other side thereof may be advanced by said drum through said field and photographed by said camera, and means for operatively connecting said guide means to said drum so as to be controlled thereby.

3. In a document handling device, the combination with a rotating drum for advancing a document through the photographic field of a camera so as to photograph one side of said document, of means for reversing said document so that the other side thereof may be advanced by said drum through said field and photographed by said camera, means controlled by the movement of said document by said drum for operating said reversing means, and means for operatively connecting said reversing means to said control means.

4. In a document handling device, the combination with a rotating drum for advancing a document through the photographic field of a camera so as to photograph one side of said document, of means for reversing said document so that the other side thereof may be advanced by said drum through said field and photographed by said camera, and guide means movable to one position to direct said document to said reversing means and movable to another position to strip said document from said drum.

5. In a document handling device, the combination with a rotating drum for advancing a document through the photographic field of a camera so as to photograph one side of said document, of means for reversing said document so that the other side thereof may be advanced by said drum through said field and photographed by said camera, guide means movable to one position to direct said document to said reversing means and movable to another position to strip said document from said drum, and means controlled by the rotation of said drum for moving said guide means.

6. In a document handling device, the combination with a rotary drum for advancing a document through the photographic field of a camera so as to photograph one side of said document, of means for reversing said document so that the other side thereof may be advanced by said drum through said field and photographed by said camera, guide means movable to one position to direct said document to said reversing means and movable to another position to strip said document from said drum, means for moving said guide means to said positions, and means operatively connecting said moving means to said drum so that said guide means will be operated in timed relation to the rotation of said drum.

7. In a document handling device, the combination with a rotary drum for advancing a document through the photographic field of a camera so as to photograph one side of said document, of means for reversing said document so that the other side thereof may be advanced by said drum through said field and photographed by said camera, guide means movable to one position to direct said document to said reversing means and movable to another position to strip said document from said drum, means for moving said guides to said positions, a blocking member normally engaging said moving means to prevent movement of said guide means, and a cam rotatable with said drum and arranged to engage and to periodically move said blocking member out of engagement with said moving means so that said guide means may be moved to one of said positions.

8. In a document handling device, the combination with a rotary drum for advancing a document through the photographic field of a camera so as to photograph one side of said document, of means for reversing said document so that the other side thereof may be advanced by said drum through said field and photographed by said camera, guide means movable to one position to direct said document to said reversing means and movable to another position to strip said document from said drum, means for moving said guide means to said positions, a cam mounted on and rotatable with said drum, and a lever movable by said cam to operatively connect said moving means to said drum so that the movement of said guide means will be in proper timed relation to the rotation of said drum.

9. In a document handling device, the combination with a rotary drum for advancing a document through the photographic field of a camera so as to photograph one side of said document, of means for reversing said document so that the other side thereof may be advanced by said drum through said field and photographed by said camera, guide means movable to one position to direct said document to said reversing means and movable to another position to strip said document from said drum, means for moving said guide means to said positions, a cam mounted on and rotatable with said drum, a pivoted lever having one end thereof resiliently held in engagement with said moving means to prevent movement of said guide means, the other end of said lever being movable into engagement with said cam in order that the latter may periodically move said one end out of engagement with said moving means so that said guide means may be moved to one of said positions, and a control lever for moving said other end into engagement with said cam.

10. In a document handling device, the combination with a rotary drum for advancing a document through the photographic field of a camera so as to photograph one side of said document, of means for reversing said document, means operated by said drum for feeding said reversed document to said drum so that the other side of said document may be advanced through said field and photographed by said camera, and guide means controlled by the rotation of said drum for feeding said document to said reversing means.

11. In a document handling device, the combination with a rotary drum for advancing a document through the photographic field of a camera so as to photograph one side of said document, of means for reversing said document, means operated by said drum for feeding said reversed document to said drum so that the other side of said document may be advanced through said field and photographed by said camera, guide means controlled by the rotation of said drum for feeding said document to said reversing means, and means operated by the advancing of said document by said drum for operatively connecting said guide means to said drum.

12. In a document handling device, the combination with a rotating drum for advancing a document through the photographic field of a camera so as to photograph one side of said document, of means for reversing said document so that the other side thereof may be advanced by said drum through said field and photographed by said camera, means mounted on and adapted to be rotated with said drum for controlling the operation of said reversing means, and means actuated by the advancing of said document for operating said control means.

13. In a document handling device, the combination with a rotating drum for advancing a document through the photographic field of a camera so as to photograph one side of said document, of means for reversing said document so that the other side thereof may be advanced by said drum through said field and photographed by said camera, guide means movable to one position to direct said document to said reversing means and movable to another position to strip said document from said drum, means for moving said guide means to one of said positions, and means including a member actuated by the advancing of said document for controlling said moving means in timed relation to the movement of said document by said drum.

14. In a document handling device, the combination with a rotating drum for advancing a document through the photographic field of a camera so as to photograph one side of said document, of means for reversing said document so that the other side thereof may be advanced by said drum through said field and photographed by said camera, guide means movable to one position to direct said document to said reversing means and movable to another position to strip said document from said drum, means for moving said guide means to one of said positions, a blocking member normally in the path of said moving means to prevent the movement of said guide means, a cam adapted to be connected to and rotated by said drum and arranged to engage and to periodically move said member out of the path of said moving means so that the latter may move said guide means to one of said positions, and a finger actuated by the advancing of said document by said drum for operatively connecting said cam to said drum so that said guide means will be moved in timed relation to the advancing of said document.

15. In an apparatus for photographically recording a document, the combination with a housing having a feeding station for said document, a rotating drum mounted in said housing for advancing said document through the photographic field of a camera so as to photograph one side of said document, of means for reversing said document so that the other side thereof may be advanced by said drum through said field, and means for obstructing said station to prevent the feeding of a second document therethrough until said other side has been advanced through said field.

16. In an apparatus for photographically recording a document, the combination with a housing having a feeding station for said document, a rotating drum mounted in said housing for advancing said document through the photographic field of a camera so as to photograph one side of said document, of means for reversing said document so that the other side thereof may be advanced by said drum through said field, a member pivotally mounted to said housing and arranged to be moved to obstruct said station to prevent the feeding of a second document therethrough until said other side has been advanced through said field, and means operatively connecting said member to said reversing means so that said member will be moved in timed relation to the operation of said reversing means.

17. In a document handling device, the combination with a rotating drum for advancing a document through the photographic field of a camera so as to photograph one side of said document, of means for reversing said document so that the other side thereof may be advanced by said drum through said field and photographed by said camera, and a manual control lever selectively movable to one position to bring said reversing means into operative position so as to successively pass opposite sides of said document through said field, said lever being also movable to another position to throw said reversing mechanism to an inoperative position so that only one side of subsequent documents will be carried through said field.

18. In a document handling device, the combination with a rotating drum for advancing a document through the photographic field of a camera so as to photograph one side of said document, of means for reversing said document so that the other side thereof may be advanced by said drum through said field and photographed by said camera, guide means movable to one position to direct said document to said reversing mechanism and movable to a different position to strip said documents from said drum, means for moving said guide means to said positions, means including a control lever for operatively connecting said guide moving means to said drum, said lever being selectively movable to one position in which the guide means is alternately moved by said drum from said one to said different position so that both sides of said document may be passed through said field, said lever being also movable to a neutral position in which the guide means is disconnected from said drum and held in said different position so only one side of said document is passed through said field, said lever being further movable to a third position in which said guide means is again alternately moved by said drum to pass both sides of said document through said field, and means movable in timed relation to the movement of said guide means for engaging said lever to automatically move the latter from said third position to said neutral position so that said guide means will be disconnected from said drum so that subsequent documents will have only one side thereof photographically recorded.

19. In an apparatus for photographically recording documents, the combination with a housing having a pair of feeding stations adjacent the top thereof, one of said stations being for small documents while the other station is for relatively long documents, a driven rotating drum mounted in said housing for advancing said documents through the photographic field of a camera so as to photograph one side of said documents, of a stationary deflector plate on the rear side of said drum adjacent said other station, said plate being arranged to reverse said document so that the other side thereof may be advanced by said drum through said field, guide means supported by said housing and adapted to be operatively connected to said drum so as to be movable to one position to direct said documents to said deflector and to another position to strip the documents from said drum, a member adapted to close one of said feeding stations until said other side of said document has passed through said field, means operatively connected to said guide means for moving said member, and a manual control lever for said guide means, said lever being adapted to be selectively positioned to operate said guide means so that either one or both sides of the documents may be photographically recorded.

20. An apparatus for photographically recording documents comprising in combination, a housing, a pair of document feeding stations adjacent the top of said housing, a driven rotating drum for advancing said documents through the photographic field of a camera so as to photograph one side of said documents, a stationary deflector for reversing said documents, means operated by said drum for feeding the reversed document to said drum so that the other side of said document may be advanced through said field and photographed by said camera, guide means movable to one position to direct said documents to said deflector and movable to another position to strip said documents from said drum after they have passed through said field, means for moving said guide means to said positions, a trip plate, a cam, means for operatively connecting said trip plate and cam to said drum so as to be rotated thereby, a lever operatively connecting said cam and said guide moving means so that the latter may be controlled by said cam, an arm engaging said plate, a finger on said arm positioned in the path of said documents when advanced by said drum, said finger being movable by said document to move said arm so that said plate and cam may be operatively connected to said drum to move said guide means in timed relation to the movement of said document, means for obstructing one of said stations to prevent the feeding of a second document until the other side of the preceding document has been photographed, and a manual control lever for moving said above-mentioned lever into and out of engagement with said cam to control the operation of said guide means.

ALVIN E. SCHUBERT.